(12) United States Patent
Takase et al.

(10) Patent No.: US 7,120,740 B2
(45) Date of Patent: Oct. 10, 2006

(54) DISK ARRAY CONTROLLER

(75) Inventors: Masayuki Takase, Kokubunji (JP);
Kazuhisa Fujimoto, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 325 days.

(21) Appl. No.: 10/638,314

(22) Filed: Aug. 12, 2003

(65) Prior Publication Data

US 2004/0111560 A1    Jun. 10, 2004

(30) Foreign Application Priority Data

Dec. 10, 2002    (JP)    ............................. 2002-357418

(51) Int. Cl.
*G06F 12/00*    (2006.01)

(52) U.S. Cl. ......................... 711/114; 711/112; 711/113

(58) Field of Classification Search ................. 710/150, 710/313, 371; 711/112–114, 154; 714/770; 703/23–25
See application file for complete search history.

(56) References Cited

U.S. PATENT DOCUMENTS

| | | | | |
|---|---|---|---|---|
| 4,535,453 A * | 8/1985 | Rhodes et al. ............... | 370/384 |
| 5,603,005 A * | 2/1997 | Bauman et al. .............. | 711/124 |
| 5,680,640 A * | 10/1997 | Ofek et al. .................... | 710/19 |
| 5,754,756 A * | 5/1998 | Watanabe et al. ............... | 714/6 |
| 5,768,623 A * | 6/1998 | Judd et al. ..................... | 710/37 |
| 5,835,940 A * | 11/1998 | Yorimitsu et al. .......... | 711/112 |
| 5,960,455 A * | 9/1999 | Bauman ...................... | 711/120 |
| 6,011,791 A * | 1/2000 | Okada et al. ................ | 370/352 |
| 6,038,681 A * | 3/2000 | Saegusa .......................... | 714/6 |
| 6,073,218 A | 6/2000 | DeKoning et al. | |
| 6,092,155 A * | 7/2000 | Olnowich ................... | 711/142 |
| 6,178,483 B1 * | 1/2001 | Runaldue et al. ........... | 711/137 |
| 6,219,751 B1 * | 4/2001 | Hodges ....................... | 711/114 |
| 6,477,619 B1 * | 11/2002 | Fujimoto et al. ........... | 711/114 |
| 6,708,232 B1 * | 3/2004 | Obara ........................ | 710/11 |
| 6,728,258 B1 * | 4/2004 | Okada et al. ............... | 370/463 |
| 2002/0006129 A1 * | 1/2002 | Kozaki et al. ........... | 370/395.1 |
| 2002/0069320 A1 * | 6/2002 | Yagi et al. .................. | 711/112 |
| 2003/0084237 A1 * | 5/2003 | Yoshida et al. ............. | 711/112 |

FOREIGN PATENT DOCUMENTS

| | | |
|---|---|---|
| JP | 2001-256003 | 3/2000 |
| JP | 2002-182864 | 12/2000 |
| JP | 2002-333956 | 5/2001 |

* cited by examiner

*Primary Examiner*—Mano Padmanabhan
*Assistant Examiner*—Thanh D. Vo
(74) *Attorney, Agent, or Firm*—Reed Smith LLP; Stanley P. Fisher, Esq.; Juan Carlos A. Marquez, Esq.

(57) ABSTRACT

Disclosed herewith is a disk array system configured by a plurality of disk array controllers and another disk array apparatus that are operated as an integrated storage system while the system is prevented from degradation of the performance. The disk array controller is provided with a channel interface unit, a disk interface unit, a cache memory unit, a shared memory unit, a shared memory interconnection network for connecting a plurality of disk array control units to each another, and an inter-unit CM-SW for connecting a plurality of disk array control units to each another. The shared memory unit includes another disk array apparatus volume information collection unit for retaining volume information of another disk array apparatus while the inter-unit CM-SW includes a protocol translation interface.

8 Claims, 10 Drawing Sheets

900: PACKET

DISK ARRAY CONTROLLER

BACKGROUND OF THE INVENTION

1. Field of the Invention

The present invention relates to a disk array controller for enabling data to be stored in a plurality of hard disk drives.

2. Description of Related Art

Improvement of the processing performance of computer systems is always expected and much efforts have been done to meet such a user's demand, especially to improve the I/O performance of disk subsystems (hereinafter, to be referred to simply as subsystems) that use magnetic disks as recording media. The I/O performance of the magnetic disks is said to be 3 to 4 figures lower than that of the semiconductor memory devices. One of the methods for improving the I/O performance of such a subsystem is to configure the subsystem by a plurality of hard disk drives and store data in those magnetic disks in parallel. The method is well known as a disk array system.

There is such a disk array controller realized by a conventional technique. A disk array controller denoted with reference number 2, as shown in FIG. 2, comprises a host computer 50, a plurality of channel interface units 11, each of which transfers data between itself 2 and a host computer 50, a plurality of disk interface units 12, each of which transfers data between itself 2 and a hard disk drive 5, a plurality of cache memory units 14 for storing data of a plurality of disk drives 5 temporarily, and a plurality of shared memory units 13 for storing control information related to itself 2 (e.g., information related to controlling of data transfer between channel interface units 11 and cache memory units 14 and management information of data to be stored in the hard disk drives 5). In the disk array controller 2, the shared memory units 13/cache memory units 14 can be accessed from all the channel interface units 11/all the disk interface units 12 respectively. Furthermore, in this disk array controller 2, the channel interface units 11/disk interface units 12 and the shared memory units 13 are connected to each other and the channel interface units 11/disk interface units 12 and the cache memory units 14 are connected to each other through interconnection networks 21 and 22 respectively.

Each channel interface unit 11 has an interface with a host computer 50 and a microprocessor, not shown, for controlling the input/output to/from the host computer 50. Each disk interface unit 12 has an interface with a hard disk drive 5 and a microprocessor, not shown, for controlling the input/output to/from the hard disk drive 5. Each disk interface unit 12 executes the RAID function.

In this conventional disk array controller 2, the capacity of the disks to be connected to one disk array 5 controller 2 is limited. If one disk array controller 2 is to record data over the capacity limit, the disk array controller 2 must be increased to two or more and the host computer 50 is connected to those controllers 2.

If one disk array controller 2 is to be connected to a plurality of host computers 50 over the number of its channels, the disk array controller 2 must be increased to two or more and each disk array controller 2 is connected to those host computers 50.

For data transfer between two data array controllers 2, channels from the host computers 50 are connected to the two disk array controllers 2 and data is transferred via the host computers 50.

U.S. Pat. No. 5,680,640 discloses a disk array controller configured as shown in FIG. 3. According to this technique, if data is transferred between two disk array controllers 3 as shown in FIG. 3, some of the interfaces (two interfaces in FIG. 3) with the host computers 50 are used as data transfer paths 8 between the two disk array controllers 3, so that data from a hard disk drive 5 connected to one disk array controller 3 is transferred to another hard disk drive 5 connected to the other disk array controller 3 through a data transfer path 8.

There is also a plurality of disk array controllers 4 (two in FIG. 4) connected to each other through their channel interface units 11 connected to an interconnection network 23 respectively as shown in FIG. 4. The interconnection network 23 functions as an interface with host computers 50. Consequently, even if data is to be recorded in one disk array controller 4 over a predetermined upper limit of capacity or even if host computers 50 are to be connected to one disk array controller over a predetermined number of channels, the number of disk array controllers or host computers may be increased.

JP-A No. 256003/2001 also discloses a disk array controller 1 that is configured as shown in FIG. 5. In the controller 1, a plurality of disk array control units 1-1 are connected to each another through an interconnection network 21 to which channel interface units 11, disk interface units 12, and shared memory units 13 are connected, as well as through an interconnection network 22 to which channel interface units 11, disk interface units 12, and cache memory units 14 are connected. Consequently, the disk array controller 1 functions as a single apparatus.

It has been demanded increasingly to realize a small configuration (small housing) advanced disk array controller with high reliability similarly to a large scale/high end disk array controller. And, along with the expansion of the open market in recent years and the spread of storage area networks (SAN) to be expected in the future, the advanced disk array controller is expected to be expanded in accordance with an increase of data to be stored.

Additionally, there also has arisen a strong and growing demand for a disk array controller, which, when it is employed newly, can be managed together with the existing one integrally and the performance degradation to be caused by the interconnection between the existing and new controllers is suppressed so as to make good use of the existing controller.

According to the conventional technique shown in FIG. 2, the number of disk array controllers 2 can be simply increased to increase the number of channels to be connected to host computers 50 and the total recording capacity. And, the conventional technique enables the use of existing disk array units. In such a case, however, data comes to be stored in two or more disk array controllers 2 sometimes and each host computer 50 must know the target disk array controller 2 to which a magnetic disk 5 that stores access data is connected. And, the host computer 50 must also know each of the connected disk array controllers individually to manage files therein. If the number of disk array controllers 2 is to be increased in accordance with system expansion, each host computer 50 might meet many problems that are difficult to be solved, such as reinstallation of the management software, etc.

Furthermore, according to the conventional technique shown in FIG. 3, the number of disk array controllers can be increased easily, since two disk array controllers 3 are already connected to each other through two data transfer paths 8. Each host computer 50 can be connected to the other disk array controller 3 only by accessing the disk array controller connected to itself directly. This is why a plurality of disk array controllers 3 can be operated integrally as one apparatus (disk array controller).

However, if a host computer 50 is to access data that is not stored in any magnetic disk 5 connected to the disk array controller 3 connected directly to itself, the host computer 50 must access the data through a data transfer path 8. In such a case, therefore, the performance of the host computer 50 comes to be degraded significantly. In addition, although it is possible to back up the data in an existing disk array controller through a channel interface unit 11, a server or the like that manages volumes between the new and existing disk array controllers is required to manage those existing and new controllers integrally.

Furthermore, according to the conventional technique shown in FIG. 4, a host computer 50 can access every disk array controller 4 through the interconnection network 23 that uses a switch, so that both new and existing disk array units can be managed together.

However, if a plurality of disk array controllers 4 are to be operated integrally as one apparatus (disk array controller), each switch of the interconnection network 23 is required to have a map for denoting which of the disk array controllers 4 connected thereto stores target data. And, the switch, when receiving an access request from a host computer 50, should be able to analyze the command set in the request and transfer the command to the disk array controller 4 that stores the requested data. In this connection, such a command analysis is required not only in the conventional channel interface unit 11, but also in the switch connected to the channel interface unit 11. Consequently, a transfer delay might occur in that case because of the processing overhead at the switch of the interconnection network 23 more than the case in which each host computer 50 is connected directly to a disk array controller 4 as shown in FIGS. 2 and 3.

According to the conventional technique shown in FIG. 5, a plurality of disk array control units 1-1 are connected to each another through an interconnection network 21 connected to channel interface units 11, disk interface units 12, and shared memory units 13, as well as through an interconnection network 22 connected to channel interface units 11, disk interface units 12, and cache memory units 14. Consequently, each of the host computers 50 connected to the disk array control units 1-1 can send/receive data to/from each of the hard disk drives 5 through the interconnection networks 21 and 22. For example, a channel interface unit, if receiving a data read request from a host computer 50, inquires whether or not the requested data exists from every shared memory unit 13 through the interconnection network 21. The place of requested data is informed to the channel interface unit 11 from the shared memory unit 13. Then, the channel interface 11 gets the requested data from the cache memory unit 14 or the magnetic disk 5 and returns the data to host computer 50.

According to the conventional technique shown in FIG. 5, each disk array control unit 1-1 inquires stored data information from each shared memory unit 13 through the interconnection network 21 and transfers data through the interconnection network 22, so that each host computer 50 can read/write data without knowing where the data is stored actually.

Consequently, even when data sets are transferred between disk array controllers, the conventional technique shown in FIG. 5 that connects a plurality of disk array control units to each another through the interconnection networks 21 and 22 provided in each disk array control unit can be prevented from significant performance degradation more effectively than any of the conventional techniques shown in FIGS. 2 through 4 that connect a plurality of disk array controllers through channel interfaces.

However, in the official gazette of JP-A No. 256003/2001 in which the controller shown in FIG. 5 is disclosed, none of configurations and methods for connecting a new disk array controller to an existing one is disclosed. And, if the interconnection network 23 that uses a switch as shown in FIG. 4 is used to connect an existing disk array controller, it causes a problem as described in the conventional technique shown in FIG. 4.

SUMMARY OF THE INVENTION

Under such circumstances, it is an object of the present invention to provide a disk array controller capable of connecting storage systems (hereinafter, to be described as disk array controllers) with different architectures to each another so as to manage them as an integrated storage system. The disk array controller is provided with a scalability for enabling the correspondence to any scale system configuration with the same high performance and high reliability architecture.

In order to solve the above conventional problems, in the disk array controller of the present invention, a plurality of disk array control units are connected to each another through an inter-unit switch. Each of the disk array control units has an external device connection interface with such external devices as host computers, magnetic disks, etc.; a shared memory, a cache memory, etc. The configuration of the disk array controller thus makes it easier to increase additional disk array control units. In addition to the disk array control units, the inter-unit switch can also be used to connect another disk array apparatus, etc.

If another disk array apparatus is connected to the interconnection switch, at least one of the plurality of disk array control units has an external volume control unit for controlling the volume information of another disk array apparatus. The communication protocol of the data used in another disk array apparatus might be different from that used in the disk array control units. In such a case, each of the disk array control units is provided with communication protocol translating means so as to translate the protocol of another disk array apparatus to the protocol of the disk array control units.

DETAILED DESCRIPTION OF THE PREFERRED EMBODIMENT

Hereunder, a description will be made for a hard disk drive as an example of a large capacity data recording apparatus. The large capacity recording apparatus may not be limited only to magnetic disk ones, however. For example, it may be such a recording apparatus as a DVD one.

If only a plurality of disk array control units that are configured similarly to each another are connected and used, a protocol translation unit, an external volume control unit, an external cache space, and an inter-unit CM-SW protocol translation interface are not used even when they are mounted. Also in that case, there is no need to mount a protocol translation interface in the inter-unit cache memory switch (CM-SW); it may be replaced with the mounted internal interface.

Hereunder, an preferred embodiment of the present invention will be described with reference to the accompanying drawings.

Figure 1:
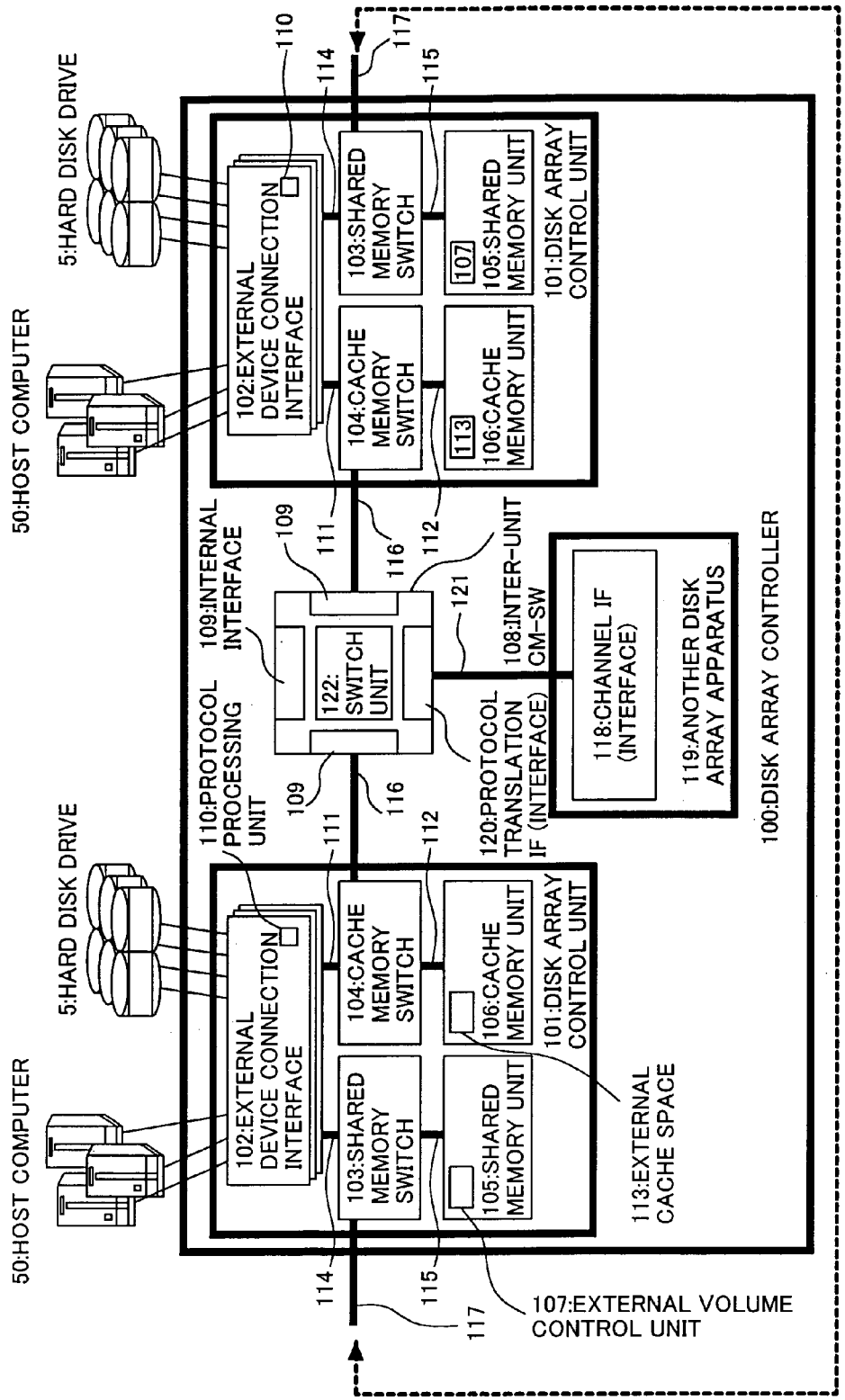
FIG. 1 is a block diagram of a disk array controller of the present invention.
Figure 2:
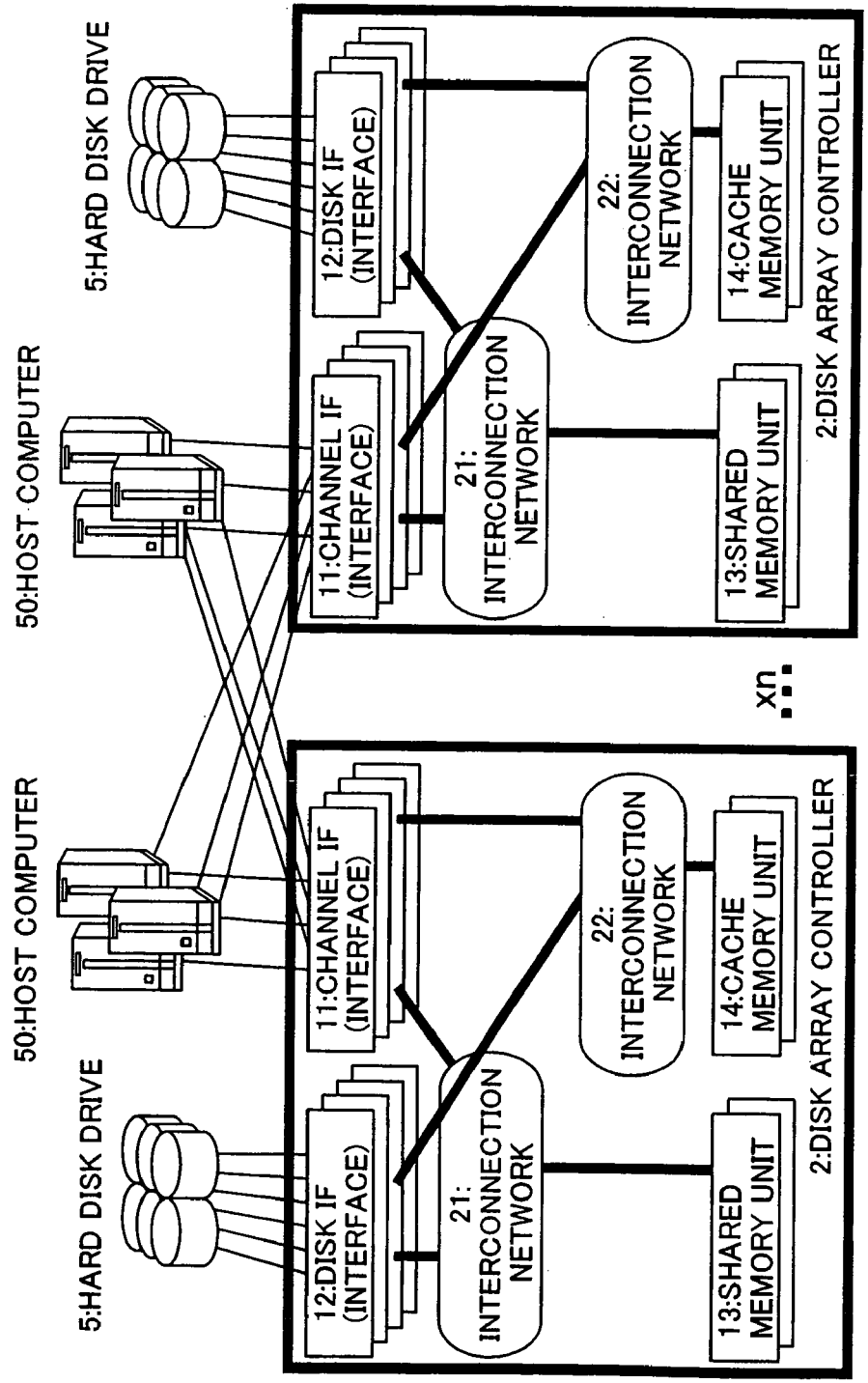
FIG. 2 is a block diagram of a conventional disk array controller.
Figure 3:
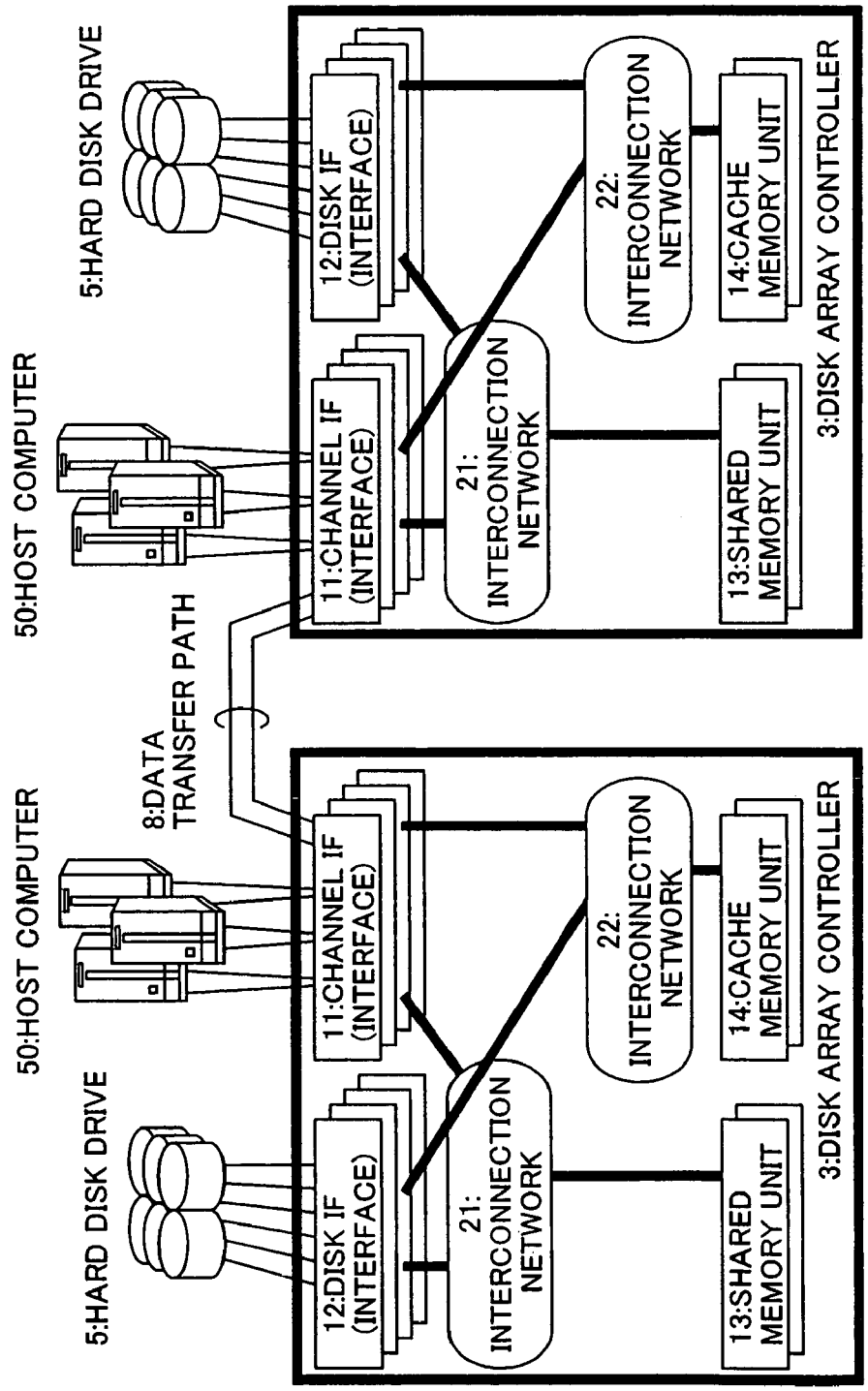
FIG. 3 is another block diagram of the conventional disk array controller.
Figure 4:
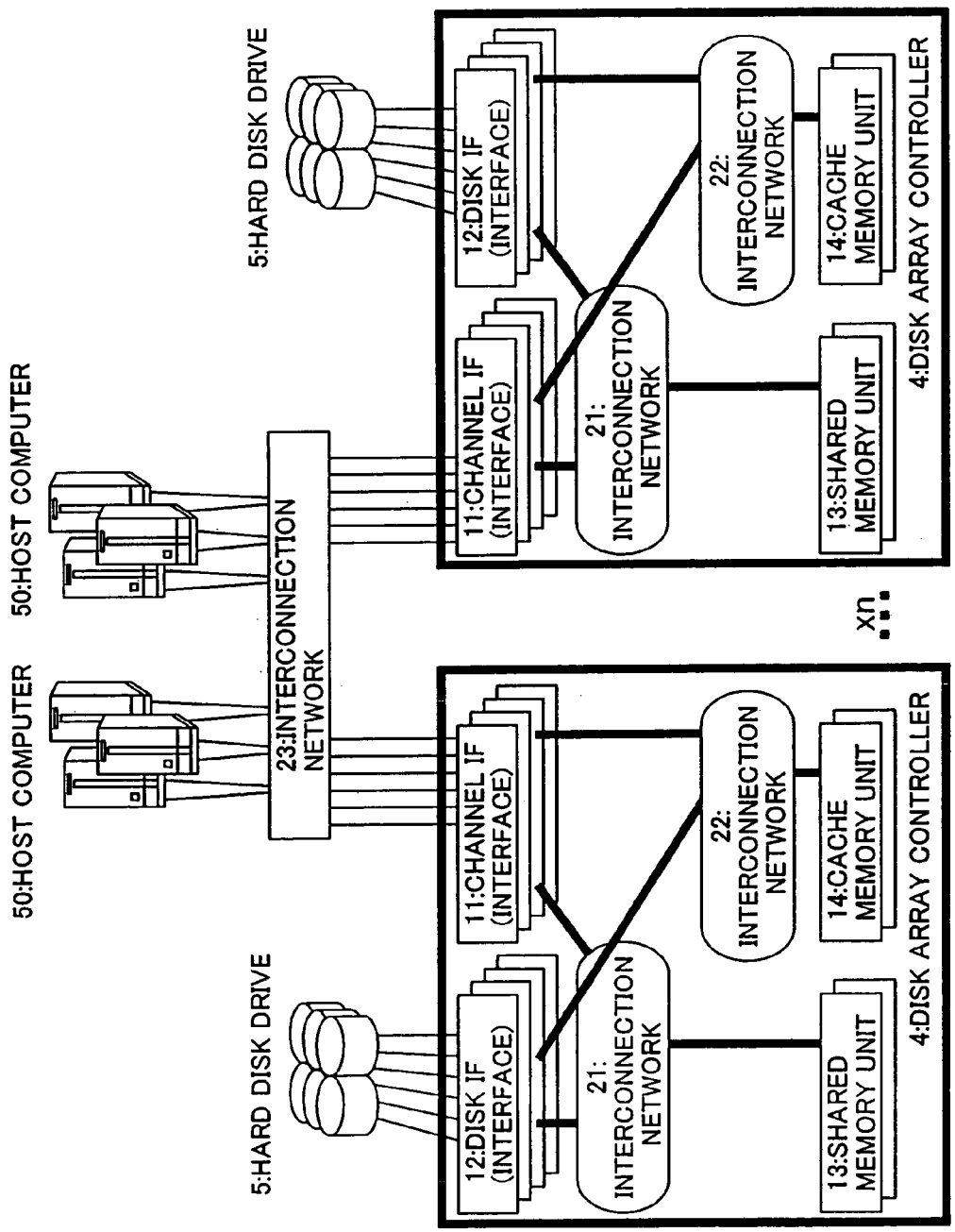
FIG. 4 is still another block diagram of the conventional disk array controller.
Figure 5:
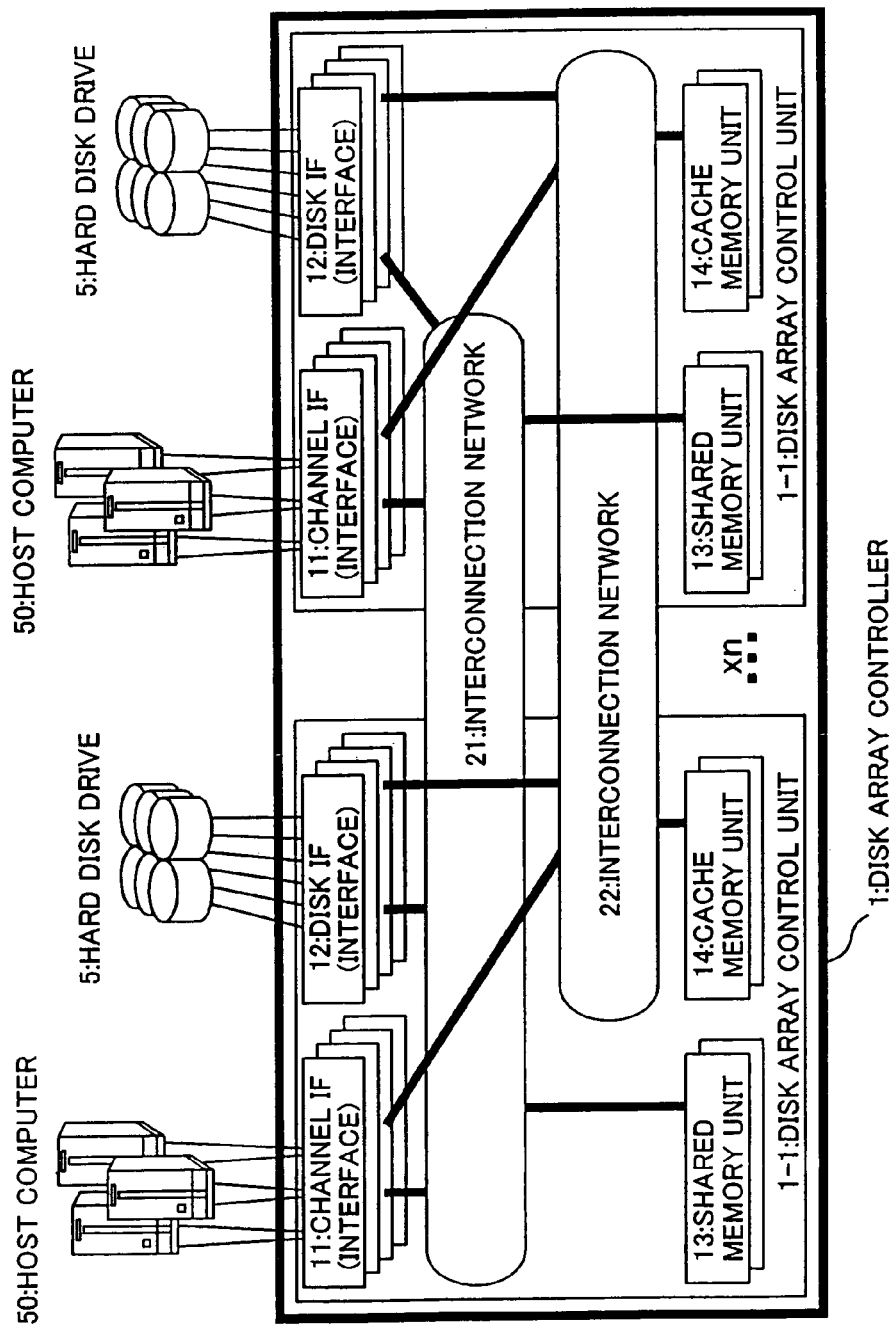
FIG. 5 is still another block diagram of the conventional disk array controller.
Figure 6:
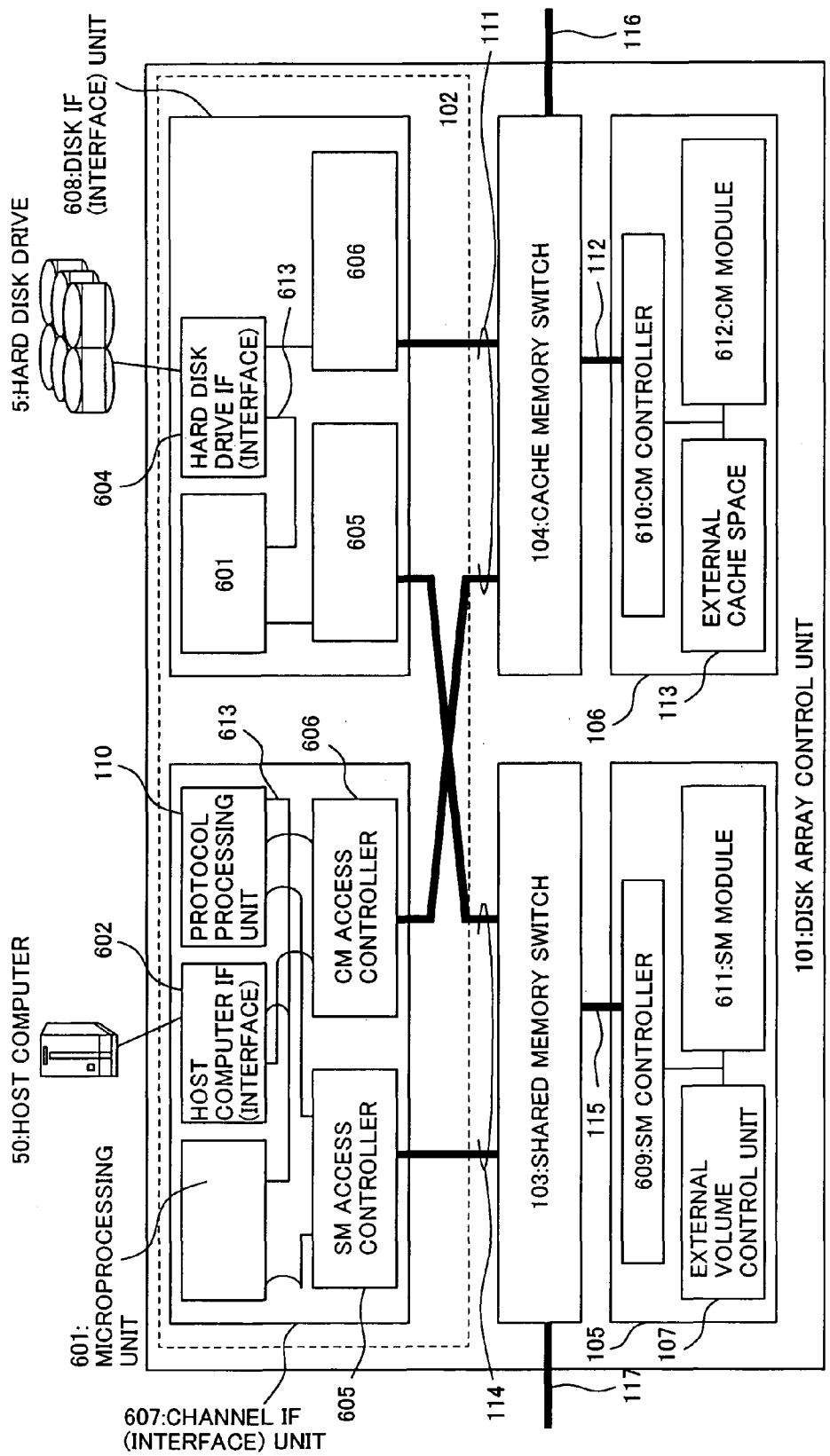
FIG. 6 is a detailed block diagram of a disk array control unit provided in the disk array controller shown in FIG. 1.

FIGS. 1 and 6 show a disk array controller and a disk array control unit in the embodiment of the present invention. As shown in FIG. 1, a disk array controller 100 is configured by a plurality of disk array control units 101, an inter-unit CM-SW 108, and another disk array apparatus 119. The controller 100 may be configured only by a plurality of disk array control units 101 and an inter-unit CM-SW 108.

In this embodiment, the external device connection interface 102 of each disk array control unit 101 can have a protocol processing unit 110, the shared memory unit 105 can have an external volume control unit 107, the cache memory unit 106 can have an external cache space 113, and the inter-unit CM-SW 108 can have two types of interfaces, that is, an internal interface 109 and a protocol translation interface 120 respectively. The disk array controller 100 can be operated as a single apparatus by managing those components integrally while suppressing the performance degradation of the apparatus. That is one of the features of the present invention.

More concretely, each disk array control unit 101 includes an external device connection interface unit 102 provided with a protocol processing unit 110 that functions as an interface unit for a host computer 50 and a hard disk drive 5; a shared memory unit 105 provided with an external volume control unit; a cache memory unit 106 provided with an external cache space 113; a shared memory switch (SM-SW) 103 for connecting the external device connection interface 102 to the shared memory unit 105; a cache memory switch (CM-SW) 104 for connecting the external device interface 102 to the cache memory unit 106; SM access paths 114, 115; CM access paths 111, 112; an inter-unit SM path 117; and an inter-unit CM path 116.

The inter-unit SM path 117 is connected to the inter-unit SM path 17 of each disk array control unit directly or through a switch, not shown. The inter-unit CM path 116 is connected to the internal interface 109 of the inter-unit CM-SW 108.

The inter-unit CM-SW 108 includes an internal interface 109 for connecting the disk array control units 101, a protocol translation interface 120 for connecting another disk array apparatus 119, and a switch unit 122. The inter-unit CM-SW 108 can have either the internal interface 109 or protocol translation interface 120 selectively. The protocol translation interface 120 has two allocated addresses; one address is used for the internal communication with another disk array apparatus 119 and the other address is used for the communication between another disk array apparatus 119 and the protocol translation interface 120.

Another disk array apparatus 119 is connected to a channel interface 118 used usually for connecting a host computer, etc. and the protocol translation interface 120 of the inter-unit CM-SW 108 through a communication cable 121 respectively. In FIG. 1, although the channel interface 118 and the inter-unit CM-SW 108 are connected to each other through a communication cable 121, the number of the communication cables may be increased according to the communication band.

The plurality of disk array control units 101 and another disk array apparatus 119 disposed as described above in a disk array controller are connected to one another around the inter-unit CM-SW 108 in the start-type topology. This means that the cache memory unit 106 or another disk array apparatus 119 can be accessed from each external device connection interface 102 in the shortest route.

FIG. 6 shows a concrete example of an internal configuration of the disk array control unit 101. The disk array control unit 101 includes an external device connection interface unit 102 that functions as an interface unit with a host computer 50 and a hard disk drive 5; a shared memory unit 105; a cache memory unit 106; an SM-SW 103 used for the connection between the interface unit 102 and the shared memory unit 105; a CM-SW 104 used for the connection between the interface unit 102 and the cache memory unit 106; SM access paths 114, 115; CM access paths 111, 112; an inter-unit SM path 117; and an inter-unit CM path 116. Each component of the disk array control unit 101 may be increased to two or more to improve the availability. The number of external device connection interface units 102 should preferably be increased/decreased in accordance with the number of host computers 50 and the number of hard disk drives 5.

The interface unit 102 should preferably have different interfaces between different types of devices, for example, a channel interface unit 607 with a host computer 50 and a disk interface unit 608 with a hard disk drive 5.

A channel interface unit 607 includes an interface (host interface) 602 with a host computer 50, a microprocessor 601 for controlling the input/output to/from the host computer 50, a protocol processing unit 110 for accessing another disk array apparatus 119, an access controller (SM access controller) 605 for controlling accesses to the shared memory unit 105, and an access controller (CM access controller) 606 for controlling accesses to the cache memory unit 106. The channel interface unit 607 enables data to be transferred between the host computer 50 and the cache memory unit 106, between the protocol processing unit 110 and another disk array apparatus 119, between the protocol processing unit 110 and the cache memory unit 106, control information to be transferred between the microprocessor 601 and the shared memory unit 105, between the protocol processing unit 110 and the shared memory unit 105, and between the microprocessor 601 and the protocol processing unit 110 respectively. The microprocessor 601, the host interface 602, and the protocol processing unit 110 are connected to each another through the internal bus 613. The SM access controller 605 is connected to the microprocessor 601 and the protocol processing unit 110 directly while the CM access controller 606 is connected to the host interface 602 and the protocol processing unit 110 directly. The microprocessor 601, the host interface 602, and the protocol processing unit 110 may be increased to two or more to improve the availability respectively. The protocol processing unit 110 retains communication addresses used for communications with another disk array apparatus 119.

A disk interface unit 608 includes an interface (drive interface) with a hard disk drive 5, a microprocessor 601 for controlling the input/output to/from the hard disk drive 5, an access controller (SM access controller) 605 for controlling accesses to the shared memory unit 105, and an access controller (CM access controller) for controlling accesses to the cache memory unit 106. The disk interface unit 608 enables transfer of control information between the microprocessor 601 and the shared memory unit 106 and transfer of data between the hard disk drive 5 and the cache memory unit 106. The microprocessor 601 and the drive interface 604 are connected to each other through an internal bus 613. The SM access controller 605 is connected to the microprocessor 601 directly while the CM access controller 606 is connected to the drive interface 604 directly. The disk interface unit also executes the RAID function.

A shared memory unit 105 includes a shared memory (SM) controller 609, a shared memory (SM) module 611, and an external volume control unit 107. The SM module 611 stores control information for the disk array control unit 101 and the another disk array apparatus 119 (ex., information related to the data transfer between the channel interface unit 607/disk interface unit 608 and the cache memory unit 106/another disk array apparatus 119, management information of data to be recorded in the hard disk drive 5). The external volume control unit 107 also retains logical volume information of another disk array apparatus 119.

A cache memory unit 106 includes a cache memory (CM) controller 610, a cache memory (CM) module 612, and an external cache space 113. The CM module 612 stores data read/written from/to the magnetic disk 5 temporarily. The external cache space 113 data read/written from/to another disk array apparatus 119 temporarily.

The SM access controller 605 is connected to the SM switch 103 through an SM access path 114. The SM switch 103 is connected to the SM controller 609 through an SM access path 115.

The CM access controller 606 is connected to the CM switch 104 through a CM access path 111. The CM switch 104 is connected to the CM controller 610 through a CM access path 112.

The SM-SW 103 is connected to the channel interface unit 607, the disk interface unit 608, the shared memory unit 105 through SM access paths 114, 115 respectively. An SM-SW 103 has an inter-unit SM path 117 used to connect the SM-SW 103 of each of other disk array control units 101. So, the channel IF units 607, the disk IF unit 608, and the SM units 105 can access the SM units 105 of all disk array control. units 101 through the SM-SW 103.

The CM-SW 104 is connected to the channel interface unit 607, the disk interface unit 608, and the cache memory unit 106 through CM access paths 111, 112 respectively. A CM-SW 104 also includes an inter-unit CM path 116 used to connect the inter-unit CM-SW 108 for connecting other disk array control units 101 and another disk array apparatus 119. So, the channel IF units 607, the disk IF unit 608, and the CM units 106 can access the CM units 106 of all disk array control units 101 through the CM-SW 104.

Next, a description will be made for an example of the inter-unit CM-SW 108 with reference to FIGS. 1, 7, 9, and 10. The inter-unit CM-SW 108 includes an internal interface 109, a protocol translation interface 120, and a switch unit 122 for searching the destination address of the data and switching the data.

Figure 9:
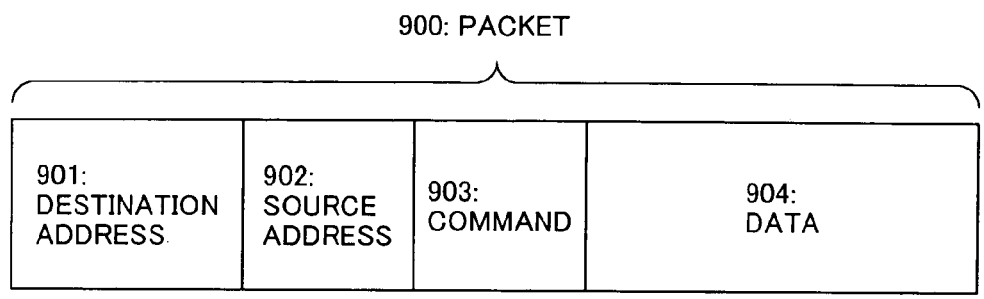
FIG. 9 is an example of a data format used for the communication between disk array control units.

FIG. 9 shows a data format used for the data transfer between disk array control units 101. Data is grouped into packets 900. A packet is configured by destination address 901, source address 902, command 903, and data 904. The destination/source address describes an address retained in the cache memory unit 106, the protocol processing unit 110 of the channel interface unit 607, and the protocol translation interface 120, respectively.

The internal interface unit 109 is connected to the disk array control unit 101 through the inter-unit CM path 116. The internal interface unit 109, when receiving a packet 900 from the disk array control unit 101, transfers the packet 900 to the switch unit 122.

Figure 7:
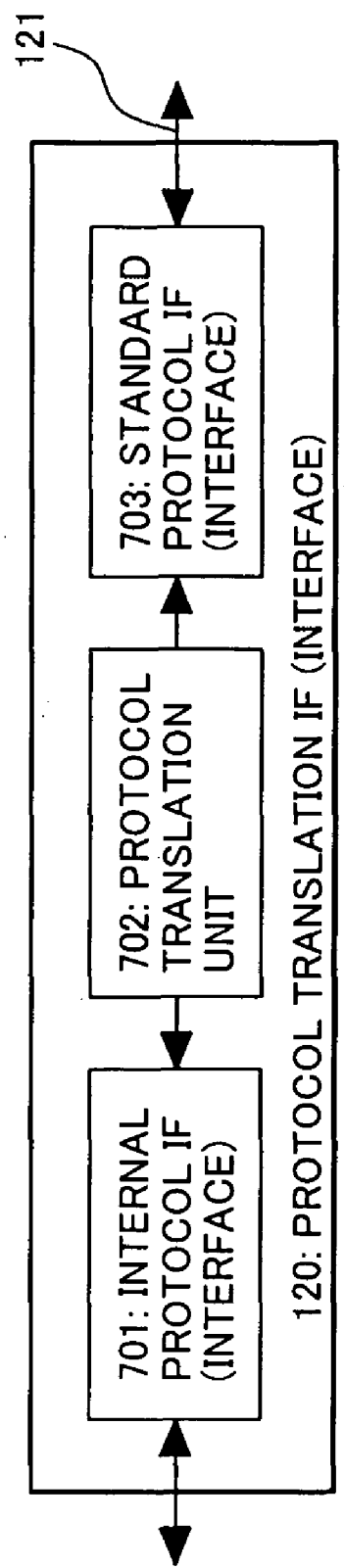
FIG. 7 is a detailed block diagram of an inter-unit CM-SW protocol translation interface provided in the disk array controller shown in FIG. 1.

The protocol translation interface 120 translates the internal communication protocol (used for the communication between disk array control units 101) to/from the standard protocol (e.g. fibre channel protocol, InfiniBand, IP) for the communication with another disk array apparatus 119. FIG. 7 shows an example of the protocol translation interface 120.

The protocol translation interface 120 is configured by an internal protocol interface 701, a protocol translation unit 702, and a standard protocol interface 703.

The internal protocol interface 701 is connected to the switch unit 122 and used to send/receive communication packets 900 to/from the disk array control unit 101. The interface 701, when receiving a packet 900 from the switch unit 122, transfers the packet 900 to the protocol translation unit 702.

The standard protocol interface 703 is connected to the channel interface 118 of another disk array apparatus 119 to send/receive data with use of such a standard protocol as the fibre channel one. When receiving a packet from another disk array apparatus 119, the interface 703 transfers the packet to the protocol translation unit 702.

The protocol translation unit 702, when receiving a packet from the internal protocol interface 701 or standard protocol interface 703, translates the internal protocol used for the communication between itself and the disk array control unit 101 into such a standard protocol as the fibre channel one or from the standard protocol into the internal protocol.

Figure 10:
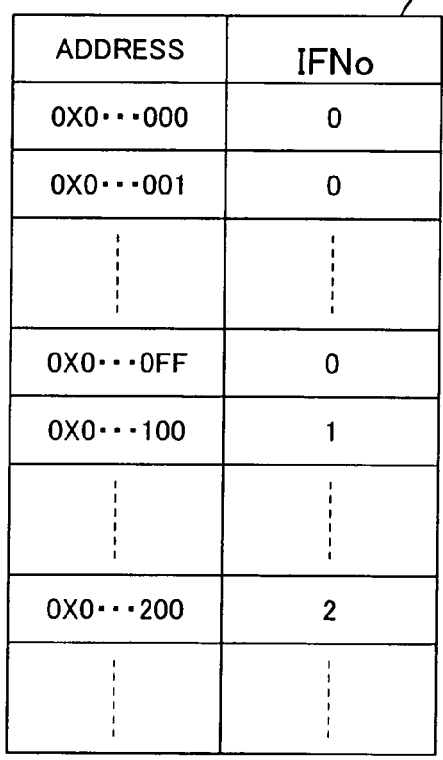
FIG. 10 is an example of a forwarding table provided in the inter-unit CM-SW.

The switch unit 122 includes a forwarding table 1000 shown in FIG. 10. The forwarding table 1000 stores the relationship between destination address and interface number (IF No.). IF No. is the identification number assigned to the interface of the inter-unit CM-SW 108. The switch unit 122 refers to this forwarding table 1000 according to the destination address 901 of the packet 900 to determine a packet destination, then switches the route of the packet to the determined destination.

The volume information of another disk array apparatus 119 is collected in the external volume control unit 107 of each disk array control unit 101 and the manager of the controller 100 allocates volumes to the host computers 50 according to the volume information.

Figure 11:
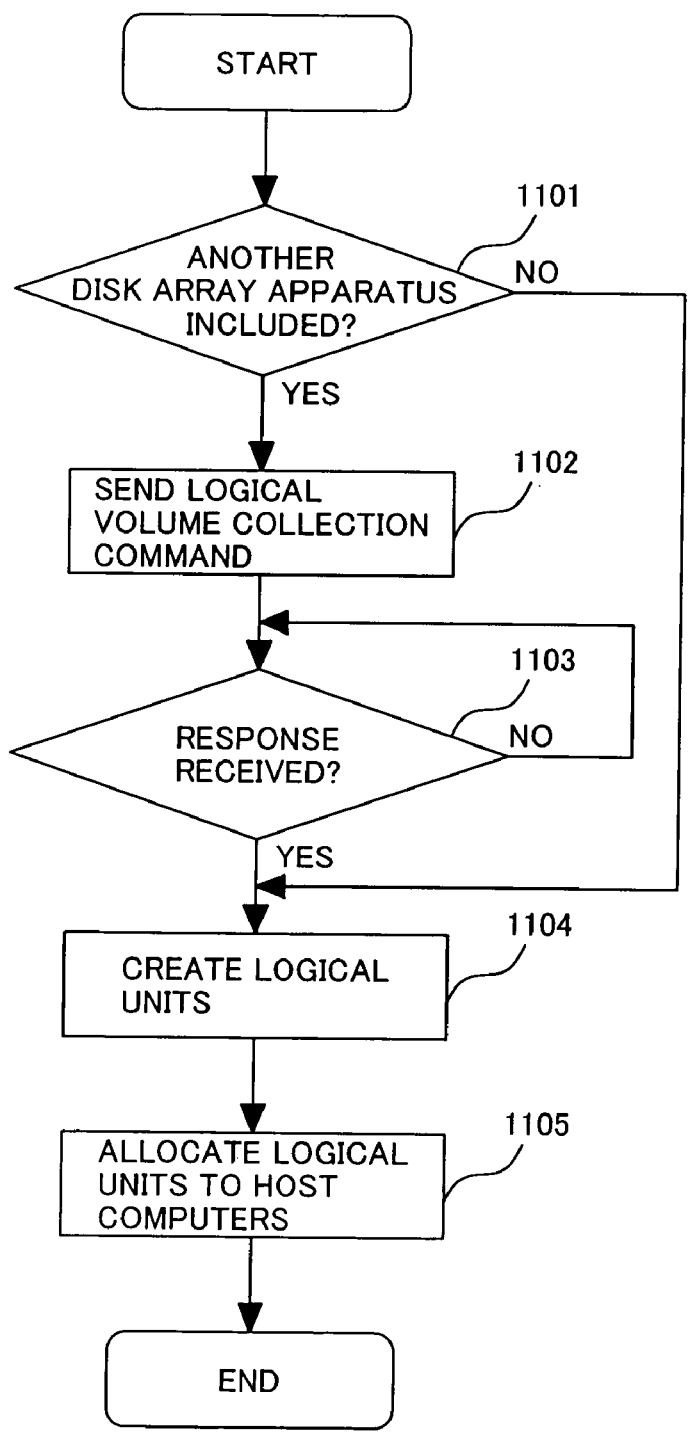
FIG. 11 is a flowchart for collecting logical volume information from another disk array apparatus.

Next, a description will be made for how the manager collects logical volumes from another disk array apparatus 119 and allocates the volumes to the host computers 50 with reference to FIGS. 8 and 11.

Figure 8:
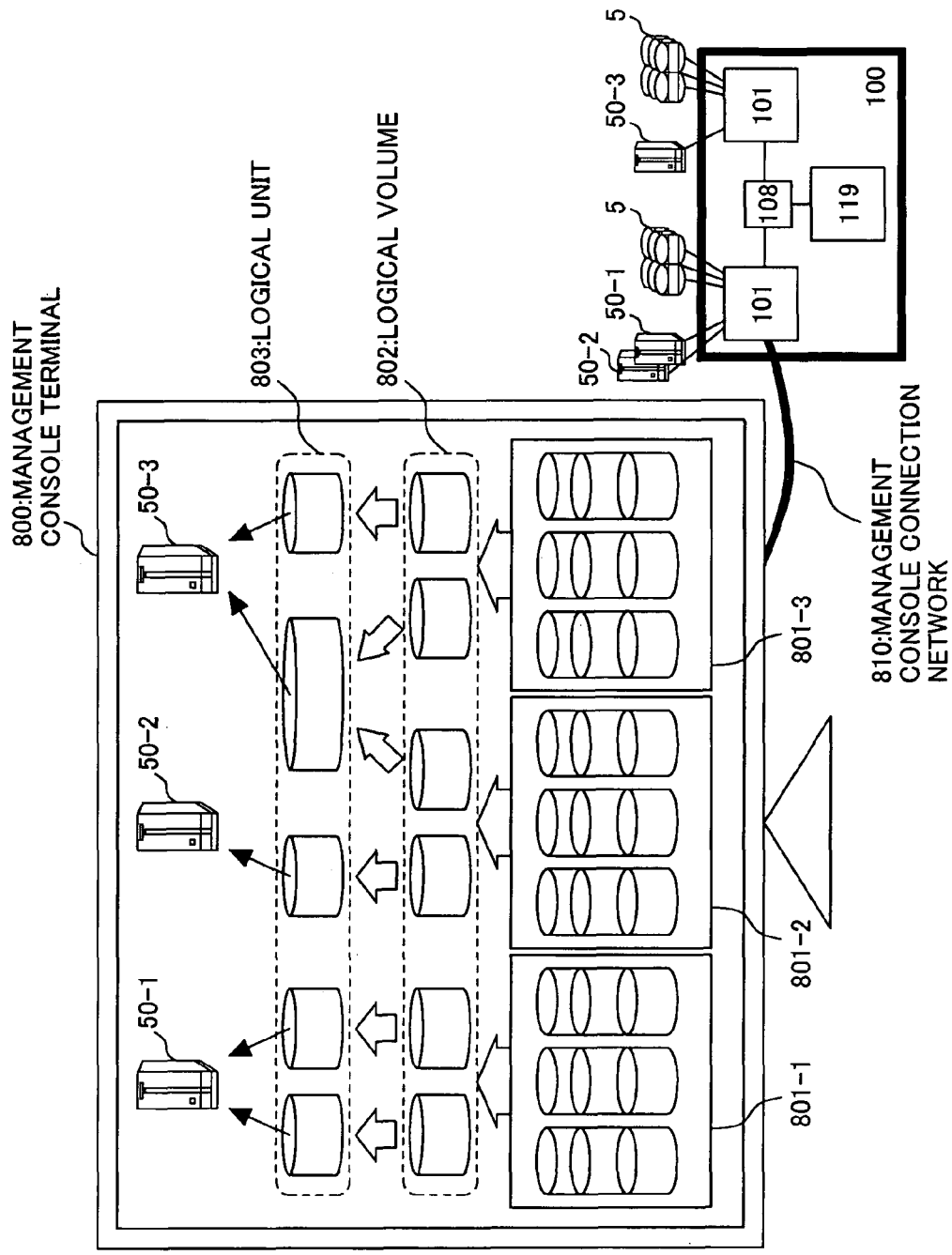
FIG. 8 is a concept chart for allocating logical units to host computers on the screen of an external management console terminal.

FIG. 8 shows a display screen of the management console terminal 800. The manager of the disk array controller 100 allocates volumes to the host computers 50-1 to 50-3 on the screen of the management console terminal 800. The management console terminal 800 is connected to one disk array control unit 101 through a management console connection network 810. FIG. 11 shows a flowchart for collecting physical volumes from another disk array apparatus 119 and allocating those volumes to the host computers 50.

In step 1101, the manager determines whether or not the disk array controller 100 includes another disk array apparatus 119. If the determination result is NO (not include), the physical volume information of the disk array control units 101 can be collected from the shared memory unit, so that the manager can recognize the physical volume information as physical volume images 801-1 and 801-2 on the screen of the management console terminal 800. If the determination result is YES (include), the manager cannot recognize the logical volume information of another disk array apparatus from the management console terminal 800.

In step 1102, the manager collects logical volume images from another disk array apparatus 119. For example, the manager can collect the logical volume images from another disk array apparatus 119 which uses a Read Capacity command.

In step 1103, the manager checks whether or not the response to the logical volume connection command is returned from another disk array apparatus 119. The volume information of another disk array apparatus 119 is retained in the external volume control unit 107. The manager can recognize the logical volume information collected in the external volume control unit 107 as a logical volume image 801-3 on the screen of the management console terminal 800.

In step 1104, the manager creates a proper size logical volume 802 from the logical volume images 801-1 to 801-3, then creates a logical unit 803 from the logical volume 802. The size of the logical volume 803 is used as a unit of volumes to be allocated to the host computers 50.

In step 1105, the manager allocates the created logical unit 803 to the host computers 50-1 to 50-3 connected to the disk array controller 100.

As described above, it is possible to allocate volumes to the host computers 50 connected to the disk array control unit 101 independently of the connected disk array control unit 101.

Next, a description will be made for how to read data stored in another disk array apparatus 119 from a host computer 50 connected to a disk array control unit 101 with reference to FIGS. 1, 6, and 7.

At first, the host computer 50 issues a read request to the channel interface unit 607 provided in the disk array control unit 101 connected to itself. The microprocessor 601 provided in the channel interface unit 607 that has received the request then accesses the shared memory unit 105 provided in each disk array control unit 101 to search the disk array control unit connected to the magnetic disk 5 or another disk array apparatus 119 that stores the requested data. The shared memory unit 105 has a translation table on correspondence between requested data address and location in which the requested data is stored. The manager can thus search the data stored address/location in this table.

After that, the microprocessor 601 provided in the channel interface unit 607 that has received the request accesses the shared memory unit 105 of each disk array control unit 101 to search the cache memory unit 106 that stores the requested data. The shared memory unit 105 stores directory information of the data in each cache memory unit 106. The microprocessor 601 can refer to the data stored in the cache memory unit 106.

If the requested data is found in the cache memory unit 106 of a disk array control unit 101 connected to the host computer 50, the microprocessor 601 transfers the data to the channel interface unit 607 through its CM-SW 104, then the data is sent to the host computer 50.

If the requested data is found in the cache memory unit 106 of another disk array control unit 101, the microprocessor 106 transfers the data to the channel interface unit 607 through the CM-SW 104 provided in the disk array control unit 101, the inter-unit CM-SW 108, and its CM-SW 104, then the data is sent to the host computer 50.

If the requested data is not found in any cache memory unit 106, the microprocessor 601 requests the protocol processing unit 110 to issue a data read SCSI command to another disk array apparatus 119 to read the data therefrom.

The protocol processing unit 110 creates a packet 900 which communicates with another disk array apparatus 119. The protocol processing unit 110 then sets the address of the protocol translation interface 108 connected to another disk array apparatus 119 in the address area 901 and the address of itself in the source address area 902, a request type (read) in the command area 903, and an SCSI read command in the data area 904 respectively, then sends the packet 900 to the inter-unit CM-SW 108 through its CM-SW 104.

The switch unit 122 of the inter-unit CM-SW 108 refers to the forwarding table 1000 to transfer the packet 900 to the protocol translation interface 120 connected to another disk array apparatus 119.

The protocol translation unit 702 retains the address of such a standard protocol as the fibre channel one, which is allocated to the channel interface 118 of another disk array apparatus 119 and the address of the protocol translation interface 120 itself.

The protocol translation unit 702 then extracts the SCSI command from the data 904 of the packet 900, translates the command format to that of such a standard protocol as the fibre channel one, sets the address of a standard protocol of another disk array unit 119 in the destination area, sets the address of a sender standard protocol in the source area, then transfers the packet to the standard protocol interface 703 as a standard protocol packet.

The standard protocol interface 703 then transfers the data to the communication cable 121. Receiving the read request, another disk array apparatus 119 returns the requested data to the protocol translation interface 108. The standard protocol interface 703 of the protocol translation interface 120 that has received the requested data transfers the data to the protocol translation unit 702.

The protocol translation unit 702 stores information for denoting the protocol processing unit 110 from which the requested data is sent. The protocol translation unit 702 thus stores the address of the protocol processing unit 110 that has requested the data in the address area 901 of the packet 900, its address in the source address area 902, the command type (read) in the command area 903, and the requested data in the data area 904 respectively after the protocol translation from the standard protocol into the internal one, then transfers the packet 900 to the internal protocol interface 701.

The packet 900 is transferred from the internal protocol interface 701 to the protocol processing unit 110 of the channel interface 607 through the inter-unit CM-SW 108 and the CM-SW 104 of the disk array control unit 101 connected to the host computer 50 that has issued the read request. The protocol processing unit 110, when receiving the packet 900, extracts the requested data from the packet 900, then writes the data in the external cache space 113 of the cache memory unit 106. At this time, the protocol processing unit 110 sends the address of the data-written external cache space 113 to the shared memory unit 105 and the microprocessor 601 provided in the channel interface 607 respectively.

The microprocessor 601 in the channel interface 607, when receiving the address, reads the data from the external cache space 113 of the cache memory unit and sends the read data to the host computer 50.

According to this embodiment, the host computer 50 connected to the disk array unit 101 is just required to issue an access request to the disk array control unit connected to itself to read/write data from/to the unit 101 without knowing where is the target data, thereby it is possible to make the host computer 50 recognize a plurality of disk array control units 101 and another disk array apparatus 119 just as one apparatus (disk array controller 1).

If data is to be read from a unit other than the disk array control unit 101 that has received the request, the data can be read through the internal inter-unit path and the cache memory unit 106, so that there is no need to transfer the data through the channel interface units 607 of both of the disk array control units 101. Thus, the data reading/writing performance can be prevented from degradation.

Data read/written from/to another disk array apparatus 119 in response to a read/write request is stored in the external cache space of the cache memory unit 106 provided in the disk array control unit 101 temporarily. If a read request is issued from a host computer 50 for the same data, the requested data is transferred without accessing another disk array apparatus 119, thereby the processing is speeded up.

If there is any data that is often accessed from a plurality of disk array controllers, the data is transferred to the disk array control units connected to the host computers 50 that have accessed the data, thereby speeding up those accesses. When data is transferred, the inter-unit connection path 117 provided in each disk array control unit 101 is used, so that there is no need to use the channel interface unit of the disk array controller to transfer data. The data transfer performance can thus be prevented from degradation. Consequently, the efficiency of the user's ordinary work is prevented from degradation.

According to the present invention, therefore, it is possible to provide a disk array system that connects another disk array apparatus to a disk array controller that can operate a plurality of disk array controllers as one apparatus (disk array controller) while suppressing degradation of the system performance, thereby managing the disk array controllers as an integrated storage system.

What is claimed is:

1. A disk array unit, comprising:
   at least one disk array control unit connected to a host computer or disk drive; and
   an inter-unit cache memory switch (CM-SW) A connected to said disk array control unit and another disk array apparatus that is different from said disk array control unit;
   wherein said disk array control unit includes:
   an external device connection interface unit connected to said host computer or disk drive;
   an internal cache memory unit for storing data read/written from/to said disk drive or said another disk array apparatus;
   an internal shared memory unit for storing control information of the connection between said external device connection interface unit and said cache memory unit and management information of said disk drive;
   an internal cache memory switch B connected to said external device connection interface unit and said cache memory unit, as well as to said switch A;
   an internal shared memory switch C connected to said external device connection interface unit and said shared memory unit; and
   an internal protocol processing unit for processing commands addressed to an external volume control unit that stores volume information of said another disk array and said disk drive,
   wherein said switch A includes:
   an internal interface corresponding to an inter-unit cache memory switch (CM-SW) protocol A used for the communication in said disk array unit; and
   a protocol translation interface for translating data transmitted between said external device connection interface unit and said another disk array apparatus via the switch A from a FC or SCSI protocol B used in said another disk array apparatus into said protocol A, and
   wherein the disk array unit determines whether or not logical volumes of said another disk array apparatus are to be allocated to said host computer, if not, the disk array unit collects physical volume information of said disk array control unit from said internal shared memory unit, if yes, the disk array unit collects logical volume information of said another disk array apparatus therefrom.

2. The disk array unit according to claim 1, wherein at least said one disk array unit or another disk array apparatus is connected to said switch A through a star-type network.

3. The disk array unit according to claim 1, wherein said external volume control unit is disposed in said shared memory unit.

4. The disk array unit according to claim 1, wherein said protocol processing unit is disposed in said external device connection interface unit.

5. The disk array unit according to claim 1, wherein said switch A includes a plurality of internal interfaces and a plurality of protocol translation interfaces.

6. The disk array unit according to claim 1, wherein said disk array controller includes a management console terminal provided with a screen for displaying volume information of another disk array apparatus.

7. A disk array controller, comprising:
   a first disk array control unit;
   a second disk array control unit; and
   an inter-unit cache memory switch (CM-SW) for connecting said first disk array unit to said second disk array control unit;
   wherein each of said first and second disk array control units includes:
   an external device connection interface unit connected to a host computer or hard disk drive;
   an internal cache memory unit;
   an internal shared memory unit; and
   an internal cache memory switch connected to said cache memory unit to said external device connection interface unit,
   wherein said inter-unit cache memory switch includes:
   a first interface connected to said first or second disk control unit;
   a second interface connected to another disk array apparatus that uses a FC or SCSI protocol different from an inter-unit cache memory switch (CM-SW) protocol used for said first and second disk control units; and means for translating data transmitted between said external device connection interface unit and said another disk array apparatus via the inter-unit cache memory switch from said inter-unit cache memory switch protocol used in both of said first and second disk control units into the FC or SCSI protocol used in said another disk array apparatus, wherein at least one of said first and second disk array control units includes means for storing volume information of said another disk array apparatus, and wherein the disk array controller determines whether or not logical volumes of said another disk array apparatus are to be allocated to said host computer, if not, the disk array controller collects physical volume information of said disk array control unit from said internal shared memory unit, if yes, the disk array controller collects logical volume information of said another disk array apparatus therefrom.

8. A method for controlling a disk array controller provided with a plurality of disk array control units, each having an interface with a host computer, a cache memory, and a shared memory; an inter-unit cache memory switch (CM-SW) connected among cache memories of said plurality of disk array control units; and another disk array apparatus connected to said inter-unit cache memory switch, said method comprising:

receiving a first data read request from said host computer;

determining an internal cache memory that stores data requested in said first read request;

sending a second data read request based on an inter-unit cache memory switch (CM-SW) protocol to said another disk array apparatus via the inter-unit cache memory switch;

translating the inter-unit cache memory switch (CM-SW) protocol used for said second read request into a FC or SCSI protocol used in said another disk array apparatus;

determining whether or not logical volumes of said another disk array apparatus are to be allocated to said host computer, if not, collecting physical volume information of said disk array control units from said shared memory, if yes, collecting logical volume information of said another disk array apparatus therefrom.

* * * * *